US012162510B2

(12) United States Patent
Saxena et al.

(10) Patent No.: US 12,162,510 B2
(45) Date of Patent: Dec. 10, 2024

(54) LOCATION INTELLIGENCE FOR BUILDING EMPATHETIC DRIVING BEHAVIOR TO ENABLE L5 CARS

(71) Applicant: HERE Global B.V., Eindhoven (NL)

(72) Inventors: Deekshant Saxena, Mumbai (IN); Senjuti Sen, Manpada (IN)

(73) Assignee: HERE Global B.V., Eindhoven (NL)

( * ) Notice: Subject to any disclaimer, the term of this patent is extended or adjusted under 35 U.S.C. 154(b) by 602 days.

(21) Appl. No.: 17/398,624

(22) Filed: Aug. 10, 2021

(65) Prior Publication Data

US 2023/0052339 A1 Feb. 16, 2023

(51) Int. Cl.
*B60W 60/00* (2020.01)
*G06F 16/29* (2019.01)
*G06F 18/24* (2023.01)
*G06N 3/00* (2023.01)
*G06N 3/045* (2023.01)
*G06N 3/08* (2023.01)

(52) U.S. Cl.
CPC ............. *B60W 60/00* (2020.02); *G06F 16/29* (2019.01); *G06F 18/24* (2023.01); *G06N 3/045* (2023.01); *G06N 3/08* (2013.01)

(58) Field of Classification Search
CPC ........ B60W 60/00; G06F 16/29; G06F 18/24; G06N 3/045; G06N 3/08
USPC ......................................................... 701/23
See application file for complete search history.

(56) References Cited

U.S. PATENT DOCUMENTS

| | | | |
|---|---|---|---|
| 10,872,433 B2 | 12/2020 | Stein et al. | |
| 2017/0285585 A1 | 10/2017 | Weast et al. | |
| 2019/0139417 A1 | 5/2019 | Kline et al. | |
| 2019/0235515 A1 | 8/2019 | Shirvani et al. | |
| 2020/0378778 A1 | 12/2020 | Glazberg et al. | |
| 2021/0053570 A1* | 2/2021 | Akella | G05D 1/0088 |
| 2021/0304602 A1* | 9/2021 | Arafa | G08G 1/147 |
| 2022/0180249 A1* | 6/2022 | Schiegg | G06N 20/00 |
| 2022/0215141 A1* | 7/2022 | Gutierrez | G06F 17/18 |
| 2022/0414501 A1* | 12/2022 | Hazard | G06N 3/006 |

OTHER PUBLICATIONS

Goodall, Noah. (2014). Ethical Decision Making During Automated Vehicle Crashes. Transportation Research Record: Journal of the Transportation Research Board. 2424. 58-65. 10.3141/2424-07. (pp. 1-8).

* cited by examiner

*Primary Examiner* — Mahmoud S Ismail
(74) *Attorney, Agent, or Firm* — Lempia Summerfield Katz LLC

(57) ABSTRACT

System and methods enable vehicles to make ethical/empathetic driving decisions by using deep learning aided location intelligence. The systems and methods identify moral islands/complex driving scenarios where a complex ethical decision is required. A Generative Adversarial Network (GAN) is used to generate synthetic training data to capture varied ethically complex driving situations. Embodiments train a deep learning model (ETHNET) that is configured to output one or more driving decisions to be taken when a vehicle comes across an ethically complex driving situations in the real world.

8 Claims, 12 Drawing Sheets

LOCATION INTELLIGENCE FOR BUILDING EMPATHETIC DRIVING BEHAVIOR TO ENABLE L5 CARS

FIELD

The following disclosure relates to navigation devices or services.

BACKGROUND

Self-driving cars may involve no human interaction at all. Autonomous vehicles may be fully automated and powered by sensors to make a vehicle aware of its surroundings. Like any new technology, there are ethical issues surrounding the creation and use of autonomous vehicles. One of the key challenges for autonomous vehicles is centered around how autonomous vehicles make decisions when there is risk involved to both the autonomous vehicle and others. For example, the design of self-driving cars needs to balance the safety of others—pedestrians, cyclists, and other vehicles—with the interests of the vehicle's passengers.

A well-established problem to achieve fully realized self-driving is building driving ethics in self-driven vehicles. Though self-driving vehicles understandably have better driving behavior as compared to human beings, there are several daily complex ethical decisions that a driver takes on day to day basis. For example, will a driver hit a man crossing illegally or will he serve sideway. Ethical artificial intelligence in vehicles broadly deals with two kinds of situation, a trolley ethical problem and a mundane ethical problem.

The trolley ethical problem involves a critical situation and a critical decision. For example, a trolley/vehicle rolling down a slope about to hit a group of women versus two children. Which one should it hit? The mundane ethical problem involves situations that are not as severe as the trolley problem, but nevertheless still include an ethical decision. For example, above, a tree trunk has blocked a road. The immediate lane is available. A human driver will swerve past the tree trunk. However, a vehicle will come to a halt following the driving rules of not crossing lanes as well as not moving forward due to obstruction. This will lead to a possible traffic congestion or worse, a blockade.

In both the situations, human interference becomes necessary for an autonomous vehicle, thus inhibiting self-driven technology reaching fully autonomous operation. The problem thus remains how to embed in self-driven cars such ethical reasonings akin to human perception so that the vehicle can take dynamic decisions that can enable true fully autonomous operation.

SUMMARY

In an embodiment, a method is provided for teaching an autonomous vehicle to make real time driving decisions when faced with ethically complex scenarios, the method comprising: generating synthetic ethically complex driving scenario data using a generative adversarial network; inputting the synthetic ethically complex driving scenario data into a deep learning model that outputs one or more driving decisions to be taken by the autonomous vehicle when input synthetic ethically complex driving scenario data; comparing the output one or more driving decision of the deep learning model with annotated driving decisions related to the input; adjusting the deep learning model based on the comparison; repeating inputting, comparing, and adjusting for a plurality of iterations; and outputting a trained deep learning model.

In an embodiment, a system is provided. The system includes a geographic database, a generative adversarial network, and a random forest classifier. The geographic database is configured to store a plurality of real ethically complex driving scenarios and a plurality of normal driving scenarios. The generative adversarial network includes a generator network and a discriminator network. The generative adversarial network is configured to input the plurality of normal driving scenarios and output a plurality of synthetic ethically complex driving scenarios. The random forest classifier is configured to train a deep learning model using the plurality of synthetic ethically complex driving scenarios and related annotated driving decisions. The deep learning model is configured to output one or more ethical driving decisions when input an ethically complex driving scenario.

In an embodiment, a method is provided including acquiring, using one or more sensors coupled with an autonomous vehicle, data about an ethically complex driving scenario; inputting the data into a deep learning model trained using synthetic ethically complex driving scenario data; receiving, from the deep learning model, one or more driving instructions for the ethically complex driving scenario; and performing, by the autonomous vehicle, the one or more driving instructions when traversing the ethically complex driving scenario.

BRIEF DESCRIPTION OF THE DRAWINGS

Exemplary embodiments of the present invention are described herein with reference to the following drawings.

DETAILED DESCRIPTION

Figure 1:
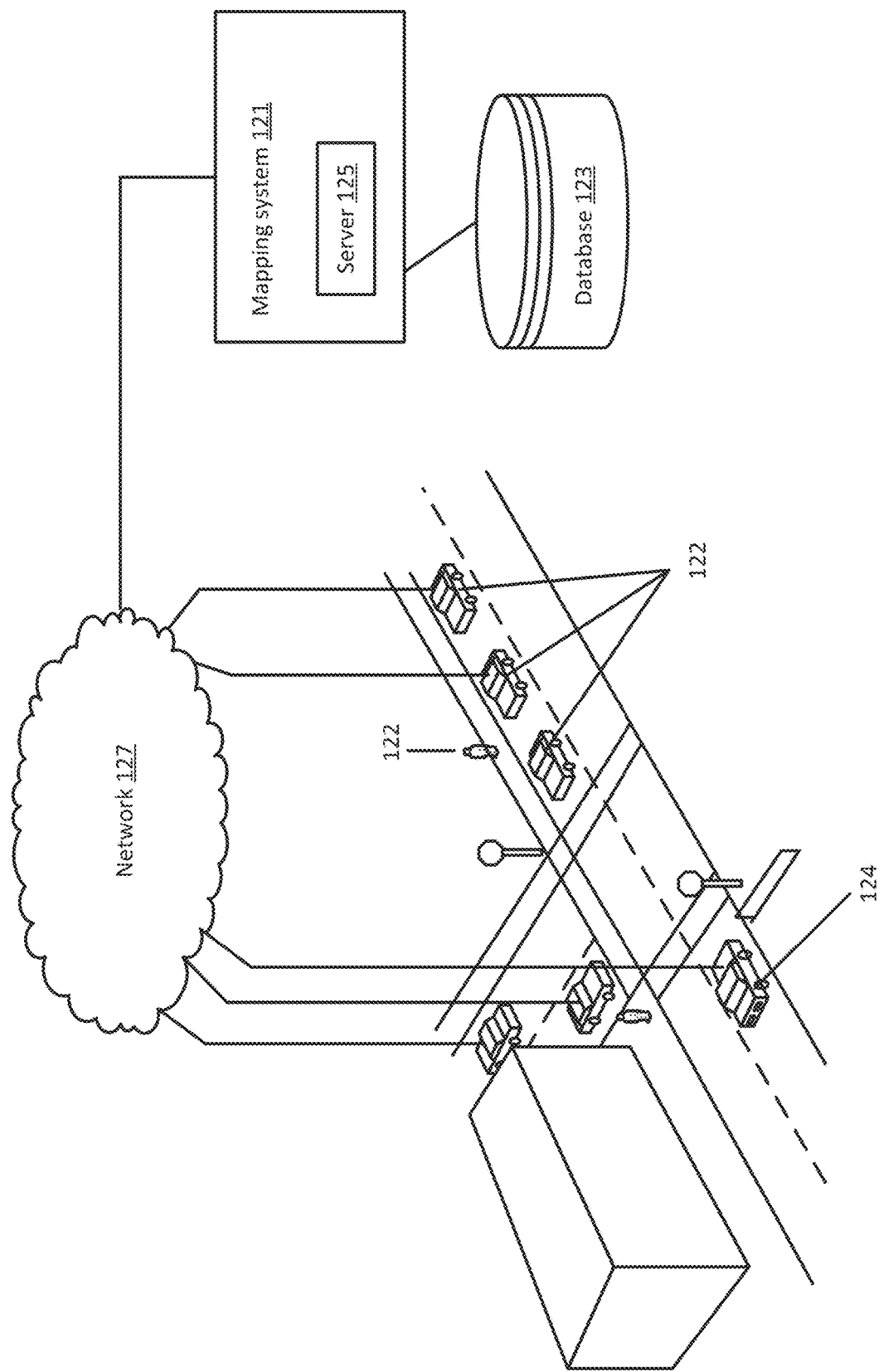
FIG. 1 depicts an example system for generating ethical driving decisions according to an embodiment.

Embodiments provide a system and method that enables vehicles to make ethical/empathetic driving decisions by using deep learning aided location intelligence. The method identifies moral islands/ethically complex driving scenarios that require a complex ethical decision. A Generative Adversarial Network (GAN) is used to generate synthetic training data to capture varied ethically complex driving scenarios. Embodiments train a deep learning model (ETHNET) that is configured to output one or more driving decisions to be taken when a vehicle comes across an ethically complex driving situations in the real world.

The systems and methods described herein may be applicable to vehicular systems in general, but more specifically to systems that support fully highly assisted, autonomous, or semi-autonomous vehicles. The term autonomous vehicle refers to a self-driving or driverless mode in which no passengers are required to be on board to operate the vehicle. There are five typical levels of autonomous driving. For level 1, individual vehicle controls are automated, such as electronic stability control or automatic braking. For level 2 at least two controls can be automated in unison, such as adaptive cruise control in combination with lane-keeping. For level 3, the driver can fully cede control of all safety-critical functions in certain conditions. The car senses when conditions require the driver to retake control and provides a "sufficiently comfortable transition time" for the driver to do so. For level 4, the vehicle performs all safety-critical functions for the entire trip, with the driver not expected to control the vehicle at any time. For level 5, the vehicle includes humans only as passengers, no human interaction is needed or possible. Vehicles classified under Levels 4 and 5 are considered highly and fully autonomous respectively as they can engage in all the driving tasks without human intervention. An autonomous vehicle may also be referred to as a robot vehicle or an automated vehicle. As defined, an autonomous vehicle may include passengers, but no driver is necessary. The autonomous vehicles may park themselves or move cargo or passengers between locations without a human operator. Autonomous vehicles may include multiple modes and transition between the modes.

Level 5 (L5) autonomous vehicles involve no human interaction at all. L5 vehicles are fully automated and powered by sensors to make it aware of its surroundings. The vehicle industry struggles to build true L5 vehicles since self-driven vehicles lack human like empathetic/ethical decision-making power. One key to solve the ethical/empathetic driving problem is location intelligence. A human driver today can take spontaneous logical decisions because of their ability to perceive the entire environment around him along with their past experiences in dealing with such instances. Thus, a spatial-temporal knowledge base supported by highly localized perception helps a human being take such ethical decisions. For example, if the lane next to the blocked one has no immediate traffic, then a decision to swerve past the fallen tree trunk enables a human driver to continue the journey without harm. This sense of judgement depends on understanding the area around the driver—does the immediate side lane have opposite direction of travel? are there lot of cars behind? is it a highway or a normal busy street? is there a sharp turn ahead? is the area mountainous? etc. The understandings are thus based predominately on the location and the locational attributes. Thus, location intelligence is what is needed to build ethics in a L5 vehicle. The challenge is that there are virtually unlimited varieties of such situations, with different localization factors.

Since, such real-world scenarios are dynamic, varied and complex, capturing each of such scenarios and training an autonomous vehicle to understand and react to each scenario is nearly impossible. Embodiments described herein use deep learning and spatial analysis to overcome these issues. Real-world areas where a complex ethical decision needs to be made are identified. Such complex decision-making areas may be called as "moral/ethical islands" or ethically complex driving locations/scenarios. These ethically complex driving scenarios are highly localized and happen in discontinuation with the general rules of driving. Embodiments use real world scenarios as raw input image from probe vehicles and device, drone-based images, or high-resolution satellite and performs edge detection for identifying obstructions and anomalies in such complex driving scenarios.

The real-world locations/scenarios may be stored and used to train the ETHNET. However, one issue is that the ethically complex driving locations need to be varied to properly train the ETHNET. Collecting a huge volume of data and classifying them is nearly impossible. Embodiments overcome this issue by using a GAN to generate synthetic ethically complex driving scenarios and as such allow the ETHNET to be trained on nearly unlimited locations/scenarios.

FIG. 1 depicts a system for location intelligence for building empathetic driving behavior to enable L5 autonomous vehicles. The system includes at least a vehicle 124, one or more devices 122, a network 127, and a mapping system 121. The mapping system 121 may include a database 123 (also referred to as a geographic database 123 or map database) and a server 125. Additional, different, or fewer components may be included. In an embodiment, the one or more devices 122 are configured to acquire data about the roadway that is stored in the geographic database 123. The mapping system 121 is configured to analyze the acquired data, identify complex driving locations, generate synthetic ethically complex driving locations using a GAN, and train a deep learning model to generate driving decisions when input an ethically complex driving location scenario. The vehicle 124 is configured to perform the generated driving decisions output by the deep learning model. The deep learning model may be stored in or on the one or more devices 122, the server 125, the mapping system 121 or the vehicle 124.

The one or more devices 122 may also include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle 124. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire roadway data. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

The data is received by the server 125 or the mapping system 121 and stored in the geographic database 123. The probe data may be analyzed, sorted, adjusted, and filtered prior to storing. The geographic database 123 and a high-definition map are maintained and updated by the mapping system 121 using the probe data and other information. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive. The mapping system 121 may include multiple servers, workstations, databases, and other machines connected together and maintained by a map developer. Each server 125 may be configured to perform a different task or alternatively to perform multiple applications.

Figure 2:
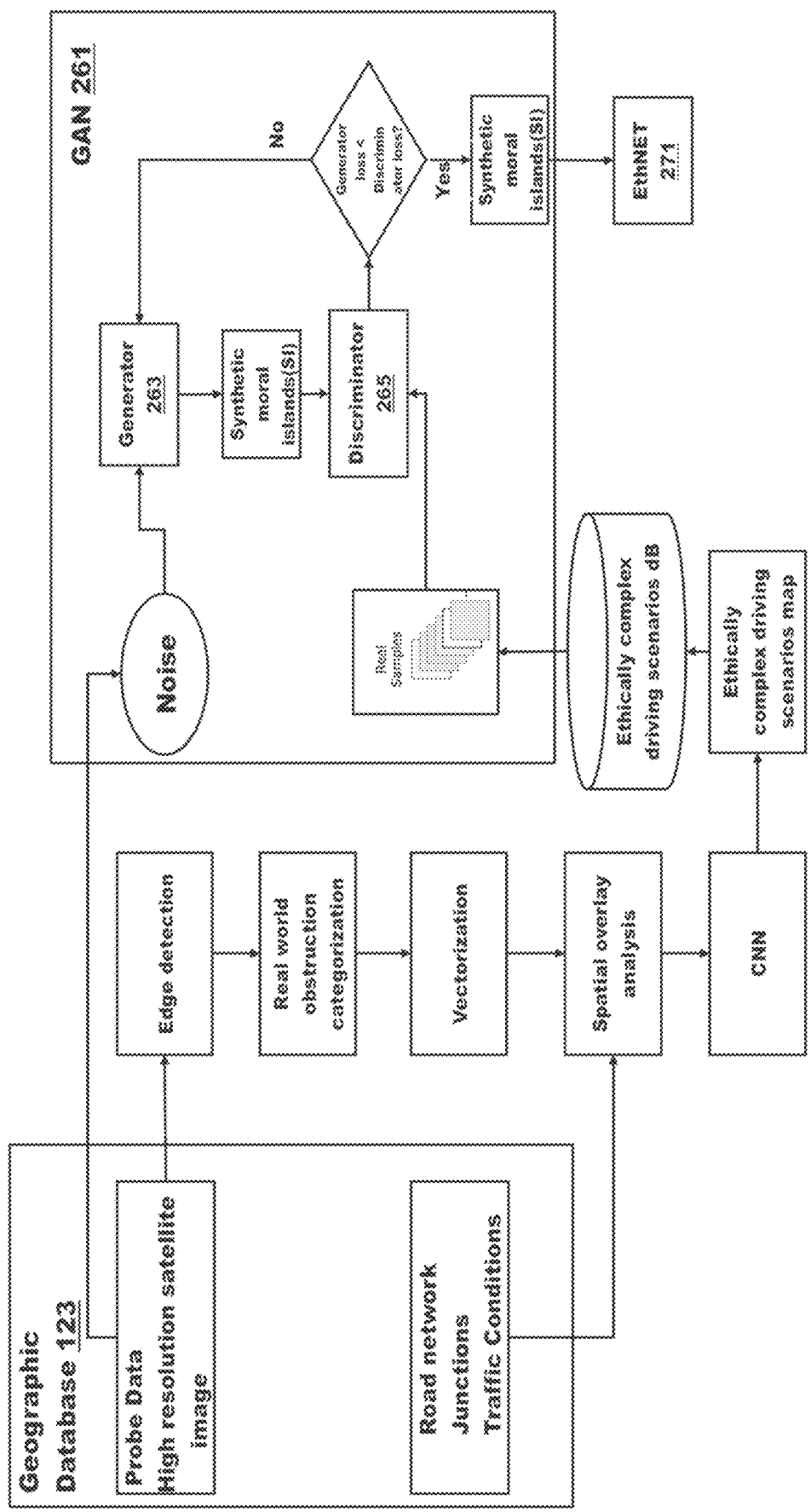
FIG. 2 depicts an example generative adversarial network configured to generate synthetic moral islands according to an embodiment.

The mapping system 121 and/or server 125 is configured to generate a trained deep model herein referred to as ETHNET. FIG. 2 depicts an example of a workflow to generate synthetic data used to train the ETHNET 271. A GAN 261 is configured with a generator network 263 and a discriminator 265 to generate synthetic moral islands (synthetic ethically complex driving scenarios). Real world ethically complex driving locations are identified using data from the geographic database 123 such as probe data, high resolution satellite images, road network data, junction data, and traffic conditions. The real-world ethically complex driving scenarios are stored in a datastore and used as the real samples to be compared to the output of the generator network 263. The geographic database 123 stores data for both normal and ethically complex scenarios. Normal scenarios are used as the noise to be input into the GAN 261.

The GAN 261 is used to generate synthetic ethically complex driving scenario data that is used with manual and automatically generated annotations to train the ETHNET 271. Noise is input into a generator network 263 that is configured to generate synthetic ethically complex driving scenarios. The noise may be derived from normal driving locations/scenarios. A discriminator network 265 attempts to distinguish between the generated synthetic ethically complex driving scenarios and real-world ethically complex driving scenarios identified in the geographic database from data acquired by the one or more devices 122. The generator network 263 and discriminator network 265 are adjusted based on the results of the discriminator network 265 until the discriminator network 265 is unable to tell the difference between the synthetic data and real-world data. During training, information from the discriminator network 265 is backpropagated to the generator network 263, so the generator network 263 knows how to adapt its parameters in order to produce output data that can fool the discriminator network 265. to attempt to limit the difference. At the end of training, the generator network 263 is able to synthesize an image from the noise and the discriminator network 265 is unable to find a difference between the synthetic data and real-world data. During training, the discriminator network 265 may be adjusted in order to get better at distinguishing the synthetic data and real-world data. Once trained, the generator network 263 is used to generate multiple synthetic ethically complex driving scenarios and related data that is then input along with annotated driving decisions (ethically determined decisions) into the ETHNET 271 which learns iteratively to determine ethical driving decisions when input a new real world complex driving scenario.

The mapping system 121 may store and update the GAN 261 and the ETHNET 271. In an embodiment, the networks are is defined as a plurality of sequential feature units or layers. The networks may include includes an encoder and a decoder. The encoder and decoder each include layers that encode or decode respectfully. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers.

Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes. In general, for convolution, subsequent units have more abstraction. For example, the first unit provides features from the image, such as one node or feature being a line found in the image. The next unit combines lines, so that one of the nodes is a corner. The next unit may combine features (e.g., the corner and length of lines) from a previous unit so that the node provides a shape indication. For transposed-convolution to reconstruct, the level of abstraction reverses. Each unit or layer in the encoder reduces the level of abstraction or compression while each unit or layer in the decoder increases the level of abstraction.

In an embodiment, a convolutional network structure is used for the discriminator network 265. The discriminator network 265 receives an input image, either a real image acquired from the real work complex driving location datastore or a synthetic image synthesized by the generator network 263. The image is propagated through a plurality of convolutional layers with the image dimension down and the channel dimension doubled. Each convolutional layer is followed by rectifiers. The final layer returns a classification label of (0) for a synthetic image or (1) for an image from the first camera. Instead of a binary classification label, the final layer may return a classification score. For example, the score may include a range of 0 to 1 with scores closer to 0 indicating a synthetic image and scores closer to 1 indicating a real image.

The networks may be configured as a DenseNet. The DenseNet connects each layer to every other layer in a feed-forward fashion. For each layer in the DenseNet, the feature-maps of all preceding layers are used as inputs, and the output feature-map of that layer is used as input into all subsequent layers. In the DenseNet, for each layer, the feature maps of all preceding layers are used as inputs, and its own feature maps are used as inputs into all subsequent layers. To reduce the size of the network, the DenseNet may include transition layers. The layers include convolution followed by average pooling. The transition layers reduce height and width dimensions but leave the feature dimension the same. The machine learnt generator network 263 may further be configured as a U-net. The U-Net is an auto-encoder in which the outputs from the encoder-half of the network are concatenated with the mirrored counterparts in the decoder-half of the network. The skip connections prevent the middle of the network from becoming a bottleneck.

Other network arrangements may be used, such as a support vector machine. Deep architectures include convolutional neural network (CNN) or deep belief nets (DBN), but other deep networks may be used. CNN learns feed-forward mapping functions while DBN learns a generative model of data. In addition, CNN uses shared weights for all local regions while DBN is a fully connected network (e.g., including different weights for all regions of an image). The training of CNN is entirely discriminative through back-propagation. DBN, on the other hand, employs the layer-wise unsupervised training (e.g., pre-training) followed by the discriminative refinement with back-propagation if necessary. In an embodiment, the arrangement of the machine learnt network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

Rather than pre-programming the features and trying to relate the features to attributes, the deep architecture of the machine network is defined to learn the features at different levels of abstraction based on an input image data with or without pre-processing. The features are learned to reconstruct lower-level features (i.e., features at a more abstract or compressed level). For example, features for reconstructing an image are learned. For a next unit, features for reconstructing the features of the previous unit are learned, providing more abstraction. Each node of the unit represents a feature. Different units are provided for learning different features.

Figure 3:
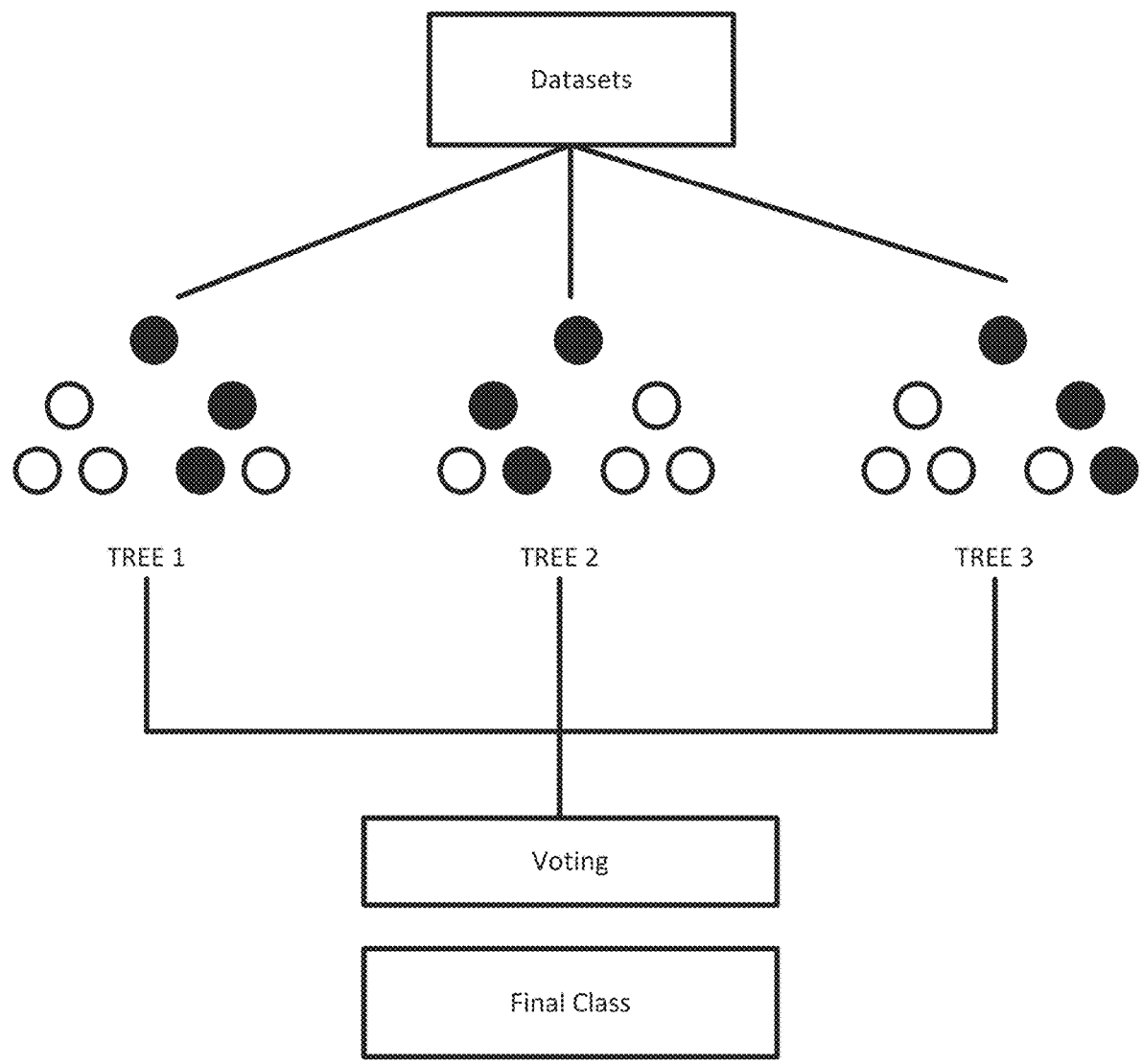
FIG. 3 depicts an example random forest classifier.

In an embodiment, the ETHNET 271 is a classifier, for example a random forest classifier. FIG. 3 depicts an example of a random forest classifier. The random forest classifier builds multiple decision trees (here three—tree 1, tree 2, tree 3 are depicted but there may be 10's, 100's, or 1000's of trees) and merges the output of the trees together to get a more accurate and stable prediction. As depicted the decision trees each include 7 nodes. In a decision tree each internal node represents a test on an attribute, each branch represents the outcome of the test, and each leaf node represents a class label (decision taken after computing all attributes). A node that has no children is a leaf. The random forest classifier creates a set of decision trees from a randomly selected subset of training set. The random forest classifier then aggregates the votes (Voting) from different decision trees to decide the final class of the test object, here the predicted driving decision.

The ETHNET 271 is trained using the synthetic complex driving locations that are annotated with ethical driving decision either by using the real-world scenarios or manually. The driving decisions mapped to the real-world scenarios are used to convert a larger set of synthetic complex driving locations to text. This may be done, for example, using text summarization process of Natural language processing. The architecture used may be, for example, CNN and Transformers. Output classes for the ETHNET 271 may be created as each possible driving decision. For example, a vehicle 124 may either move forward, backwards, left, right, or take a u turn or go round, accelerate or slow down. Extreme conditions may include either starting or stopping. Other driving actions may be possible depending on the vehicle 124 and the interface. For example, lights may be turned on or off (blinkers/headlights) and/or a horn or audio output may be generated.

In an embodiment, once the training dataset is ready, a random decision forest is trained on the training data. The random decision forest is a combination of multiple decision trees that are be mapped to the final output of classes of driving direction. Since the training dataset contains numerous conditions of complex driving locations and its related ethical driving decision, the use of random forest model enables the ETHNET 271 to predict driving decisions based on such conditions. The output of the training process is a model that is referred to as ETHNET 271 that instructs an autonomous vehicle 124 to take real time driving decisions when faced with complex situations. The mapping system 121 or server 125 may acquire and store the data used for the GAN 261 and the ETHNET 271. Once trained, the ETHNET 271 may be stored in or on an autonomous vehicle 124 so that driving decisions may be provided immediately after sensors acquire data about a real-world complex driving scenario. The mapping system 121 may update the ETHNET 271 as new data is acquired. ETHNET 271 may also be provided as a service using, for example, the server 125.

The server 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service also provides information generated from probe data provided by the devices 122. For example, the server 125 may provide an HD map or geographic database updates. The server 125 may provide a copy of or instructions from the ETHNET 271 model when provided with real world data about a location or portion of a roadway that a device 122 or vehicle 124 is traversing. The server 125 may provide historical, future, recent or current traffic conditions for the links, segments, paths, or routes using historical, recent, or real time collected data. The server 125 is configured to communicate with the devices 122 and/or the autonomous vehicles 124 through the network 127. The server 125 is configured to receive a request from a device 122 or an autonomous vehicle 124 for a route or maneuver/driving instructions and generate one or more potential routes or instructions using data stored in the geographic database 123. The server 125 may broadcast data, publish data, respond to specific requests, or otherwise make data available to other services, applications, or users.

To communicate with the devices 122, systems or services, the server 125 is connected to the network 127. The server 125, devices 122, autonomous vehicles 124, and mapping system 121 may receive or transmit data through the network 127. The server 125 may also transmit paths, routes, or risk data through the network 127. The server 125 may also be connected to an OEM cloud that may be used to provide mapping services to vehicles 124 via the OEM cloud or directly by the server 125 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 and vehicles 124 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The mapping data, navigation data, and other data relating to the roadway or traffic may be stored in the geographic database 123, for example in a high definition (HD) map. The HD map and the geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Remote sensing, such as aerial or satellite photography, may be used. The database 123 is connected to the server 125. The geographic database 123 and the data stored within the geographic database 123 may be licensed or delivered on-demand. Other navigational services or traffic server providers may access the traffic data stored in the geographic database 123. Data for an object or point of interest may be broadcast as a service.

The vehicle 124 is configured to communicate with the server 125, mapping system 121, devices 122, and/or geographic database 123. A mobile device 122 may be integrated in the vehicle 124, which may include assisted driving vehicles such as autonomous vehicles 124, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122 and/or mapping system 121. The assisted driving vehicles may respond to the lane marking indicators (lane marking type, lane marking intensity, lane marking color, lane marking offset, lane marking width, or other characteristics) received from geographic database 123 and the mapping system 121 and driving commands or navigation commands.

The term autonomous vehicle 124 may refer to a self-driving or driverless mode in which no passengers are required to be on board to operate the vehicle 124. An autonomous vehicle 124 may be referred to as a robot vehicle or an automated vehicle. The autonomous vehicle 124 may include passengers, but no driver is necessary. These autonomous vehicles 124 may park themselves or move cargo between locations without a human operator. Autonomous vehicles 124 may include multiple modes and transition between the modes. The autonomous vehicle 124 may steer, brake, or accelerate the vehicle 124 based on the position of the vehicle 124 in order, and may respond to lane marking indicators (lane marking type, lane marking intensity, lane marking color, lane marking offset, lane marking width, or other characteristics) received from geographic database 123 and the mapping system 121 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles 124 may also be driven in a manual mode in which the human operator exercises a degree of control over the movement of the vehicle. The vehicles 124 may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the mapping system 121 and driving commands or navigation commands.

Similarly, ADAS vehicles 124 include one or more partially automated systems in which the vehicle alerts the driver. The features are designed to avoid collisions automatically. Features may include adaptive cruise control, automate braking, or steering adjustments to keep the driver in the correct lane. ADAS vehicles 124 may issue warnings for the driver based on the position of the vehicle or based on the lane marking indicators (lane marking type, lane marking intensity, lane marking color, lane marking offset, lane marking width, or other characteristics) received from geographic database 123 and the mapping system 121 and driving commands or navigation commands.

In an embodiment, the vehicle 124 is configured to identify ethically complex driving locations/scenarios using one or more sensors embedded in the vehicle 124 or in communication with the vehicle 124 or device 122. The one or more devices 122 and/or the autonomous vehicle 124 may be configured to acquire positioning data, image data, radar/LIDAR data, or other data about the autonomous vehicle 124, other vehicles, a current section of roadway, and/or an upcoming section of roadway. Positioning data may be generated by a global positioning system, a dead reckoning-type system, cellular location system, or combinations of these or other systems, that may be referred to as position circuitry or a position detector. The positioning circuitry may include suitable sensing devices that measure the traveling distance, speed, direction, and so on, of a device 122 or autonomous vehicle 124. The positioning system may also include a receiver and correlation chip to obtain a GPS or GNSS signal. Alternatively, or additionally, the one or more detectors or sensors may include an accelerometer built or embedded into or within the interior of a vehicle 124 that provides information to a device 122. A vehicle 124 may include one or more distance data detection devices or sensors, such as a LiDAR or RADAR device. Radar sends out radio waves that detect objects and gauge their distance and speed in relation to the vehicle 124 in real time. Both short- and long-range radar sensors may be deployed all around the car and each one has their different functions. While short range (24 GHz) radar applications enable blind spot monitoring, for example lane-keeping assistance, and parking aids, the roles of the long range (77 GHz) radar sensors include automatic distance control and brake assistance. Unlike camera sensors, radar systems typically have no trouble when identifying objects during fog or rain. The vehicle 124 may also be equipped with LiDAR. LiDAR sensors work similar to radar systems, with the difference being that LiDAR uses lasers instead of radio waves. Apart from measuring the distances to various objects on the road, the vehicle 124 may use LiDAR to create three-dimensional images of the detected objects and map the surroundings. The vehicle 124 may use LiDAR to create a full 360-degree map around the vehicle 124 rather than relying on a narrow field of view.

The distance data detection sensor may include a laser range finder that rotates a mirror directing a laser to the surroundings or vicinity of a vehicle on a roadway or another collection device on any type of pathway. Such a vehicle 124 includes a communication device and an environment sensor array for detecting and reporting the surroundings of the vehicle 124 to the mapping system 121 in order to, for example, generate a three-dimensional map or to identify and analyze lines of sight or obstructions that could limit visibility of a certain location. The vehicle 124 may include an integrated communication device coupled with an in-dash navigation system. The vehicle 124 may include an ad-hoc communication device such as a mobile device or smartphone in communication with a vehicle system. The communication device connects the vehicle 124 to a network 127 including at least the mapping system 121.

The device 122 and/or autonomous vehicle 124 may also use passive sensors, such as vision-based techniques with cameras or other imaging sensors to understand its position and provide information to the mapping system 121 to analyze and identify complex driving locations. Vision-based techniques are used to acquire information about obstacles, other vehicles, and the geometry of the roadway and surrounding environment. Video data, image data, or other sensor data may be collected and processed to identify information about a particular location. Image recognition methods or classifiers such as neural networks may be used to identify features or obstacles for an area. The image data may be used by the mapping system 121 along with mapping data stored in the geographic database 123 to understand the location of the vehicle 124 and what driving decisions should be made.

Figure 4:
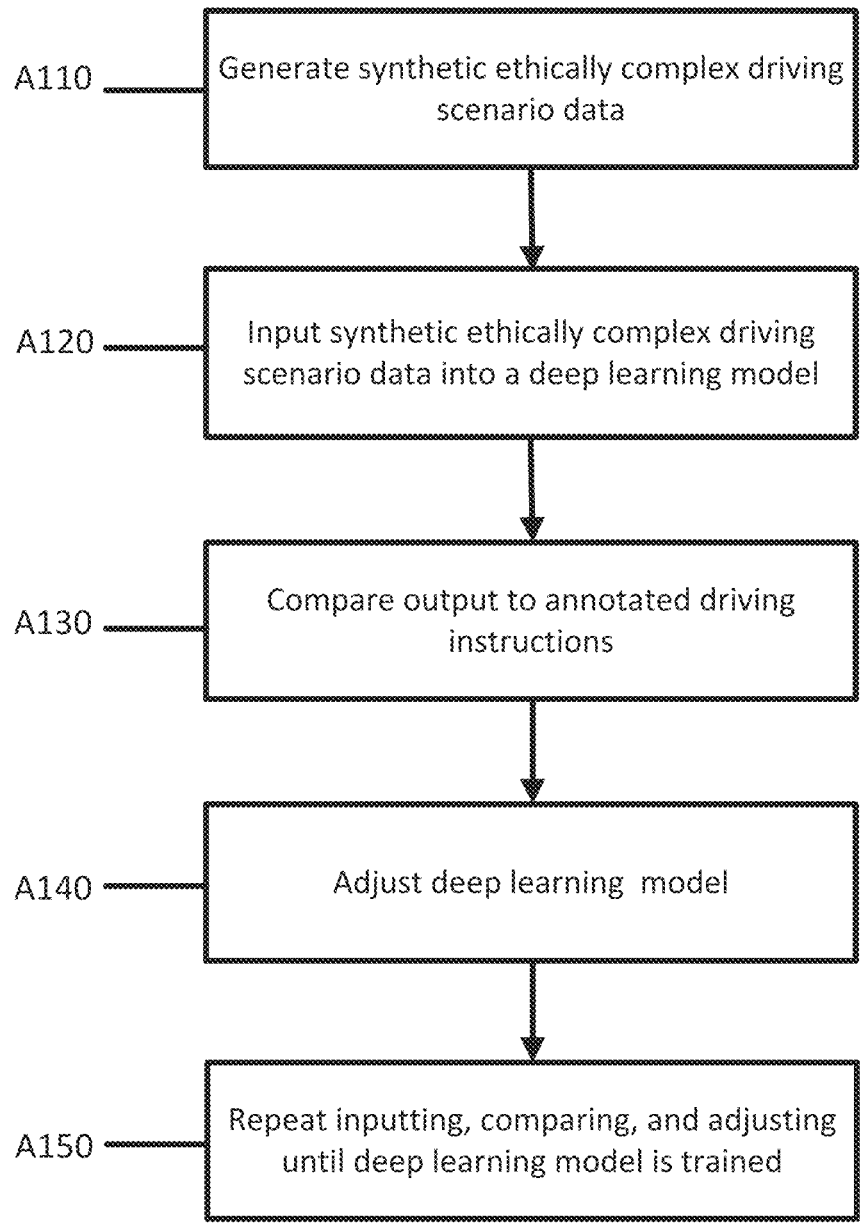
FIG. 4 depicts an example workflow for training a deep learning model to generate ethical driving decisions according to an embodiment.

In an embodiment, the vehicle 124 is configured to input the acquired data into a deep learning model that is configured/trained to output one or more driving decisions. The vehicle 124 is configured to perform the one or more driving decisions. FIG. 4 depicts a workflow for generating the deep learning model that is configured to output one or more driving decisions for ethically complex driving scenarios. As presented in the following sections, the acts may be performed using any combination of the components indicated in FIG. 1, 2, 3, 6 or 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, the mapping system 121 generates synthetic ethically complex driving scenarios using a generative adversarial network and mapping data from a geographic database. Complex driving locations may include, for example, locations on the roadway that required a complex ethical decision. One of the biggest challenges for training the deep learning model to understand these complex locations and provide ethical decisions is acquiring useful training data. In general, the more training data (and higher quality training data) that is used, the better the resultant deep learning model. However, collecting a huge volume of data and classifying the data is nearly impossible. In an embodiment, a generative adversarial network (GAN 261) is used.

Figure 5:
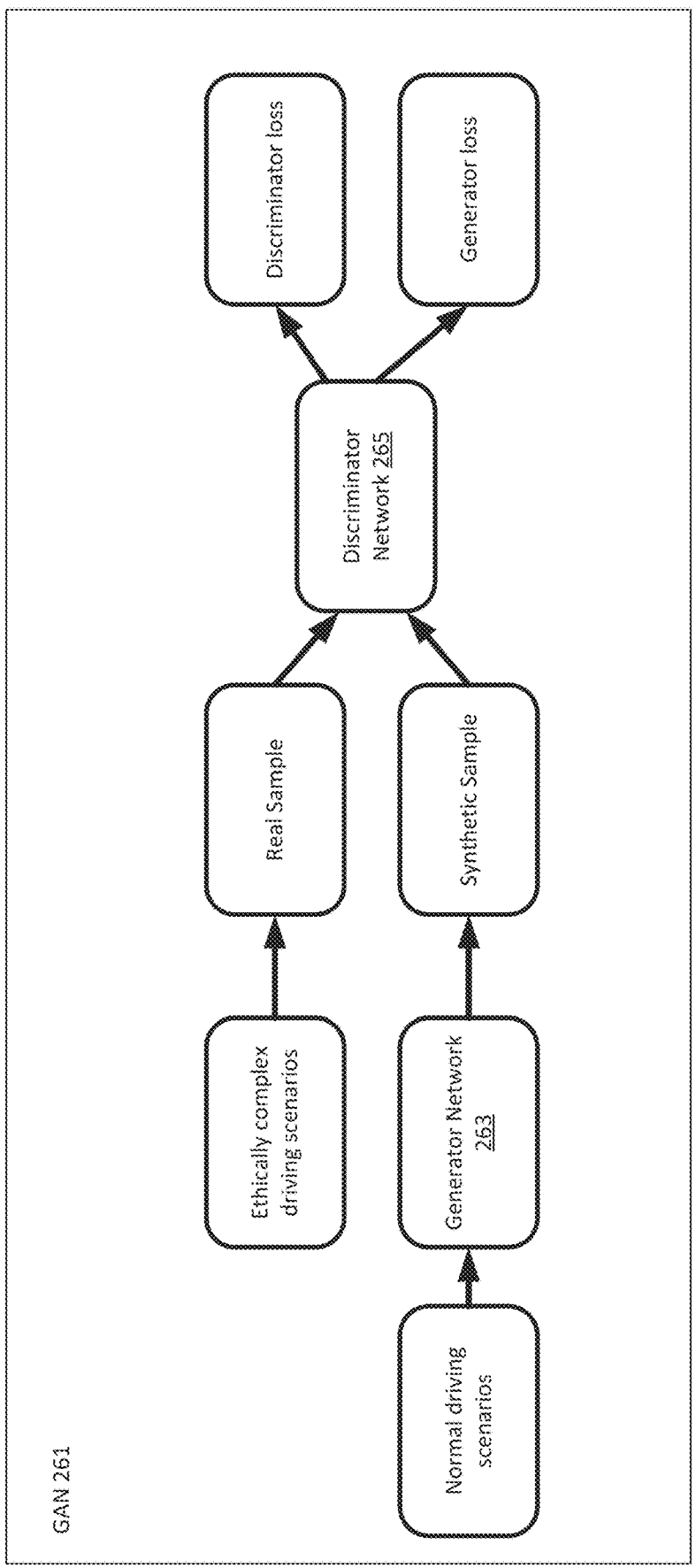
FIG. 5 depict an example generative adversarial network according to an embodiment.

FIG. 5 depicts an example GAN 261. The GAN 261 includes at least two parts, a generator network 263 and a discriminator network 265. The generator network 263 learns to generate plausible data. The generated instances become negative training examples for the discriminator network 265. The discriminator network 265 learns to distinguish the generator's fake data from real data. The discriminator network 265 penalizes the generator network 263 for producing implausible results. The generator network 263 and discriminator network 265 architecture of GAN 261 is leveraged to create numerous synthetic conditions that can be then mapped to a specific country, county, region or area to generate synthetic complex locations (moral/ethical islands).

During the training process, the generator network 263 attempts to generate an output that can fool the discriminator network 265 into thinking that the output is from the training set of data. The discriminator network 265 tries to distinguish real data from the data created by the generator network 263. In an embodiment, the generator network 263 takes normal driving scenarios (and/or noise) as its input. The normal driving scenarios may be an image or feature data that relates to roadway data. The generator network 263 then transforms the input into a meaningful output, for example a feature set or image(s) that describes an ethically complex driving location. By introducing noise, the generator network 263 is able to produce a wide variety of data, sampling from different places in the target distribution.

The output of the generator network 263 is input randomly with real world sample data into the discriminator network 265. The real-world sample data may include manually identified ethically complex driving scenarios that require a complex ethical decision. This is the data the generator network 263 is attempting to emulate. The discriminator network 265 classifies the input as either real data or fake data from the generator network 263 and provides a discriminator loss and a generator loss that are used to adjust the networks. The discriminator network 265 may use any network architecture appropriate to the type of data it's classifying. The discriminator network 265 is trained using the discriminator loss that penalizes the discriminator network 265 for misclassifying a real instance as fake or a fake instance as real. The loss from the discriminator classification is backpropagated though both the discriminator network 265 and generator network 263 to obtain gradients. The gradients are used to change the generator network 263 weights. The GAN 261 training proceeds in alternating periods. The discriminator network 265 trains for one or more epochs and then the generator network 263 trains for one or more epochs. This is repeated for a number of iterations or until the networks converge. The output is a generator network 263 that is capable of producing a large volume of plausible synthetic complex driving locations that require a complex ethical driving decision.

In an example, the generator network 263 is trained to generate an image of an ethically complex driving scenario and the discriminator network 265 classifies and distinguishes between the two types of images (real ethically complex driving scenario images and the synthetic images generated by the generator network 263). The discriminator network 265 provides the generator loss to the generator network 263. The information provided by the discriminator network 265 may be in the form of a gradient that is calculated as a function of a comparison of the probability distributions of the images, e.g., comparing a first probability distribution of values for the generated image with an expected probability distribution of values for the ground truth image. The gradient may include both a direction and a slope that steer updates for the generator network 263 in the right direction. After a number of iterations, the gradient directs the generator network 263 to a stable place where the generator network 263 is generating images with probability distributions that are similar to the ground truth images. The gradients provided by the discriminator network 265 change as the generator network 263 generates and provides new images.

The training data for the GAN 261 (and other networks) may include ground truth data or gold standard data, for example real ethically complex driving scenario data. Ground truth data and gold standard data is data that includes correct or reasonably accurate labels. The training data may be acquired at any point prior to inputting the training data into the trained network. In an example operation, images and/or feature data for real-world ethically complex driving scenarios are acquired and identified automatically. In a first step, real world driving scenarios are identified. Real world scenarios may be used as raw input image, for example true drive files, drone-based images, or high-resolution satellites. Edge detection is performed to identify obstructions, anomalies in such spots. The roadway network (ped, Ramps, highways, streets, crossings, etc), junctions, traffic conditions, topography layers, and other data is overlaid. This data may then be converted into a matrix. A CNN may input this data and used to classify the location as a moral island/ethically complex driving location. For example, a presence of all of the input matrices is definitely a dominant moral island. A presence of less than all of the input matrices or conditions classifies the area as a weak moral island or just a normal driving situation.

The training data may be updated after acquiring new data. The updated training data may be used to retrain or update the trained network. The trained generator network 263 outputs synthetic moral island images/conditions that may be used to train/configure the deep learning model.

At act A120, the mapping system 121 inputs the synthetic ethically complex driving scenarios into a deep learning model that predicts and outputs one or more driving decisions to be taken by an autonomous vehicle 124 when input an ethically complex driving scenario. The ethically complex driving scenarios may include both the synthetic output from the generator network 263 or real-world ethically complex driving scenarios. Both the synthetic ethically complex driving scenarios and the real-world complex driving locations require a complex ethical decision for an operator of a vehicle 124. The input data may include feature data, image data, or other data related to the location or scenario. Each set of inputs is mapped to or assigned one or more driving decisions that are ethical and more human like. Initially the driving decisions may be provided manually. The manual driving decisions that are mapped to the ethically complex driving scenario data may then be used to convert a larger set of complex driving locations (inputs—cat a, cat b) to text. In an embodiment, the conversion to text may use a text summarization process of Natural language processing.

In an embodiment, the deep learning model is configured as a classifier, for example, a random forest classifier. Once the training dataset is ready, the random forest classifier is trained on the training data. A random forest includes a large number of individual decision trees that operate as an ensemble. Each individual tree in the random forest outputs a class prediction and the class with the most votes is the model's prediction. Alternative voting mechanisms may be used. Each individual tree includes a decision tree algorithm that can be used to solve regression as well as classification problems.

In an embodiment, the random forest classifier is a combination of several decision trees that are mapped to the final output of classes of driving direction. Since the training dataset is containing numerous conditions of ethically complex driving scenarios and related ethical driving decisions, the use of random forest model enables the deep learning model to predict driving decisions based on such conditions. In an embodiment, the random forest combines hundreds or thousands of decision trees, trains each one on a slightly different set of the observations, splitting nodes in each tree considering a limited number of the features. The final predictions of the random forest are made by averaging the predictions of each individual tree. The random forest classifier may be trained with the "bagging" method that includes a combination of learning models.

The output of the deep learning model is one or more suggested driving decisions. The driving directions are finite. A vehicle 124 can accelerate or deaccelerate forward, backwards, left, right, etc. These driving decisions may be grouped to generate a fluid operation such as to take a u turn or go round, accelerate to a certain speed or slow down to a certain speed. The driving decisions may also be atomic and correspond to particular operations of an autonomous vehicle 124.

At Act A130, the mapping system 121 compares the output of the deep learning model with the annotated driving decisions. When a random forest classifier is used, each tree may be individually trained, trained as a group, or trained in multiple groups. At Act A140, the mapping system 121 adjusts the deep learning model based on the comparison. A loss mechanism may be used to train the classifier. At act A150, the mapping system 121 repeats A120-140 for a plurality of iterations. The number of iterations may be 10, 100, 1000, or more. The number of iterations may depend on how quickly the decisions trees and forest can reach an acceptable point where the deep learning model determined to be accurate. Different training methods may be used, such as bagging in order to avoid overfitting or underfitting the model. For training each decision tree, the process starts with the training dataset that includes some feature variables and a classification output. The best feature is determined to split the data on. The data is then split into subsets that contain the possible values for this best feature. This splitting defines a node on the tree i.e., each node is a splitting point based on a certain feature from the data. New tree nodes are recursively generated using the subset of data. Splitting continues until the tree is optimized, by some measure, maximum accuracy while minimizing the number of splits/nodes. The election of which feature to use and the specific split may be chosen using a greedy algorithm to minimize a cost function. After the plurality of iterations, the mapping system 121 outputs a trained deep learning model. The trained deep learning model may be updated as new data is acquired. The trained deep learning model may be stored and accessed at the mapping system 121 or, for example, at or on a device 122 or autonomous vehicle 124.

Figure 6:
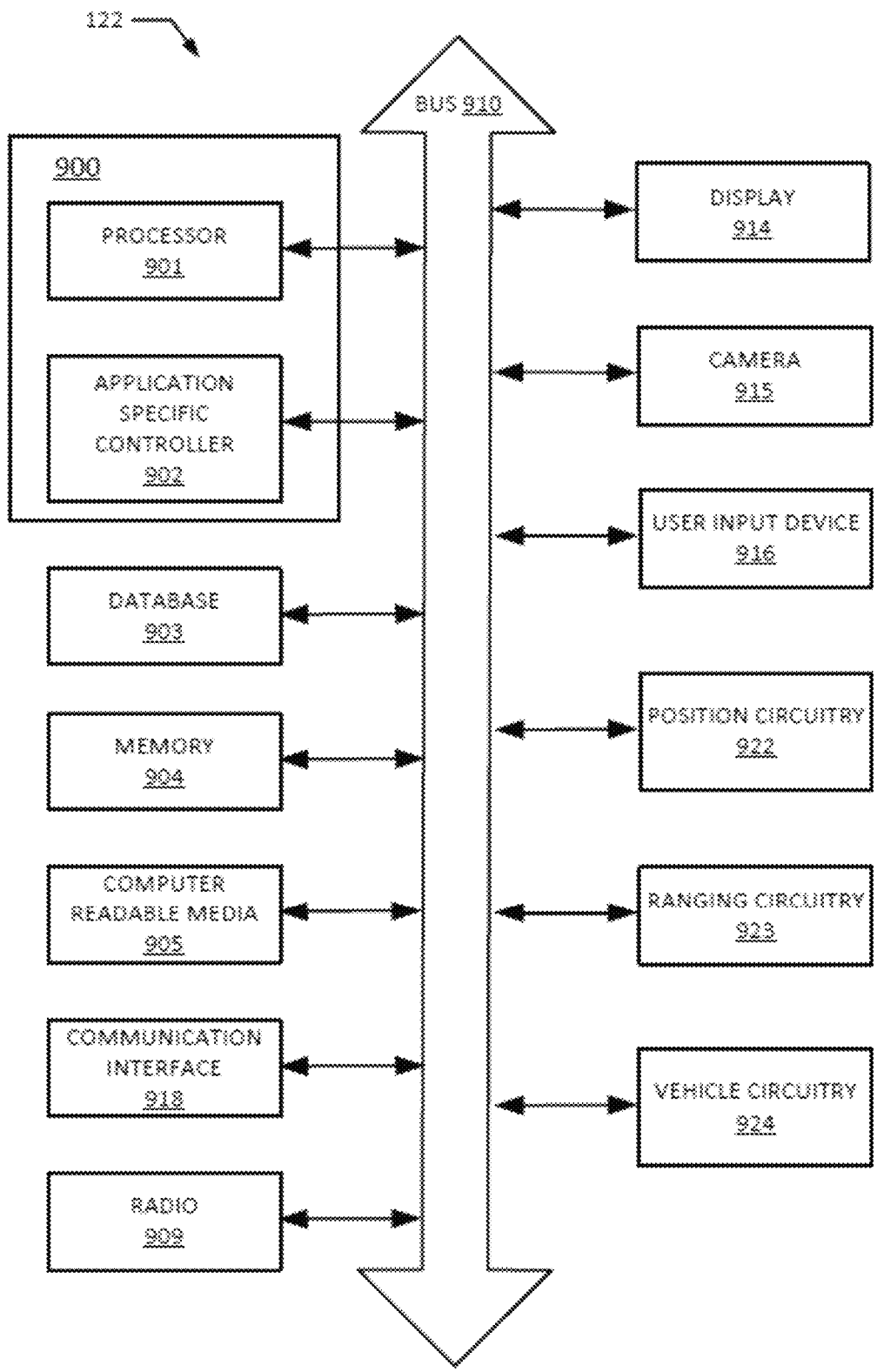
FIG. 6 depicts an example device of the system of FIG. 1.

FIG. 6 illustrates an example mobile device 122 for the system of FIG. 1 that is configured to provide ethical driving decisions when confronted with a complex driving location. The mobile device 122 may include a bus 910 that facilitates communication between a controller 900 that may be implemented by a processor 901 and/or an application specific controller 902, that may be referred to individually or collectively as controller 900, and one or more other components including a database 903, a memory 904, a computer readable medium 905, a communication interface 918, a radio 909, a display 914, a camera 915, a user input device 916, position circuitry 922, and ranging circuitry 923. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 1). Additional, different, or fewer components may be included.

Figure 7:
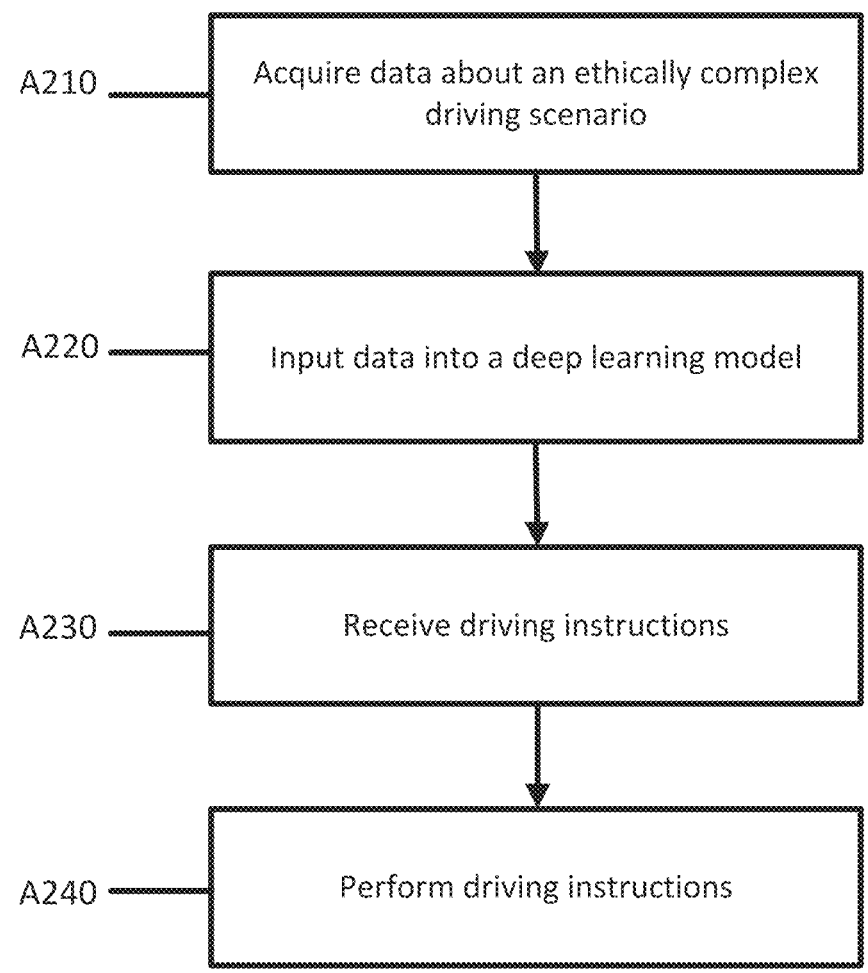
FIG. 7 depicts an example workflow for applying a deep learning model to generate ethical driving decisions according to an embodiment.

FIG. 7 depicts an example workflow for implementing, by the device 122 of FIG. 6, one or more driving decisions generated by a deep learning model trained on synthetic ethically complex driving scenarios. As presented in the following sections, the acts may be performed using any combination of the components indicated in FIG. 1, 2, 3, 6 or 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

At act A210, the controller 900 acquires data about and identifies an upcoming ethically complex driving scenario. Identification may be based on a route of the vehicle 124, roadway conditions stored in the geographic database, and/or sensor data acquired by, for example, the position circuitry 922, and ranging circuitry 923.

The controller 900 may include a routing module including an application specific module or processor that calculates routing between an origin and destination. The routing module is an example means for generating a route. The display 914 is an example means for displaying the routing command. The mobile device 122 may generate a routing instruction based on the anonymized data. The routing instructions may be provided by the display 914. The mobile device 122 may be configured to execute routing algorithms to determine an optimum route to travel along a road network from an origin location to a destination location in a geographic region. Using input(s) including map matching values from the mapping system 121, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments. The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. The position circuitry 922 may also include gyroscopes, accelerometers, magnetometers, or any other device for tracking or determining movement of a mobile device 122. The gyroscope is operable to detect, recognize, or measure the current orientation, or changes in orientation, of a mobile device 122. Gyroscope orientation change detection may operate as a measure of yaw, pitch, or roll of the mobile device 122.

The ranging circuitry 923 may include a LiDAR system, a RADAR system, a structured light camera system, SONAR, or any device configured to detect the range or distance to objects from the mobile device 122. The ranging circuitry may also include cameras at different angles and may be capable of maintaining a 360° view of its external environment. The device 122 may utilize three-dimensional cameras for displaying highly detailed and realistic images. These image sensors automatically detect objects, classify them, and determine the distances between them and the device 122. For example, the cameras may easily identify other cars, pedestrians, cyclists, traffic signs and signals, road markings, bridges, and guardrails.

The positioning data and sensor data may be stored with or cross checked with data stored in the geographic database 123. The geographic database 123 is configured to receive and store data about the roadway from the mapping system 121. The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes. The geographic data may additionally or alternatively include other data records such as, for example, POI data records, topographical data records, cartographic data records, routing data, and maneuver data.

Figure 8:
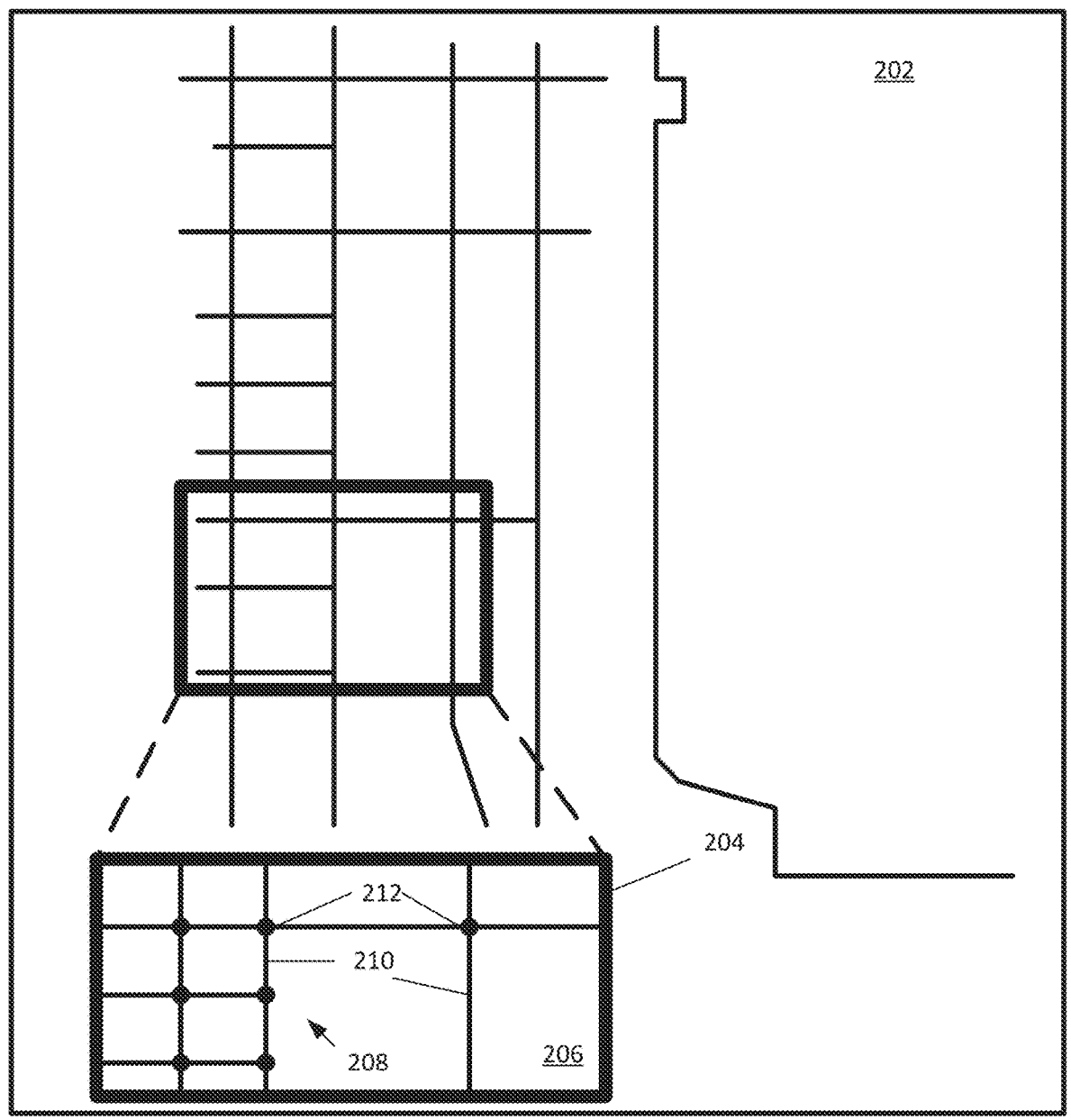
FIG. 8 depicts an example region of the geographic database of FIG. 1.

FIG. 8 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc. FIG. 8 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 9:
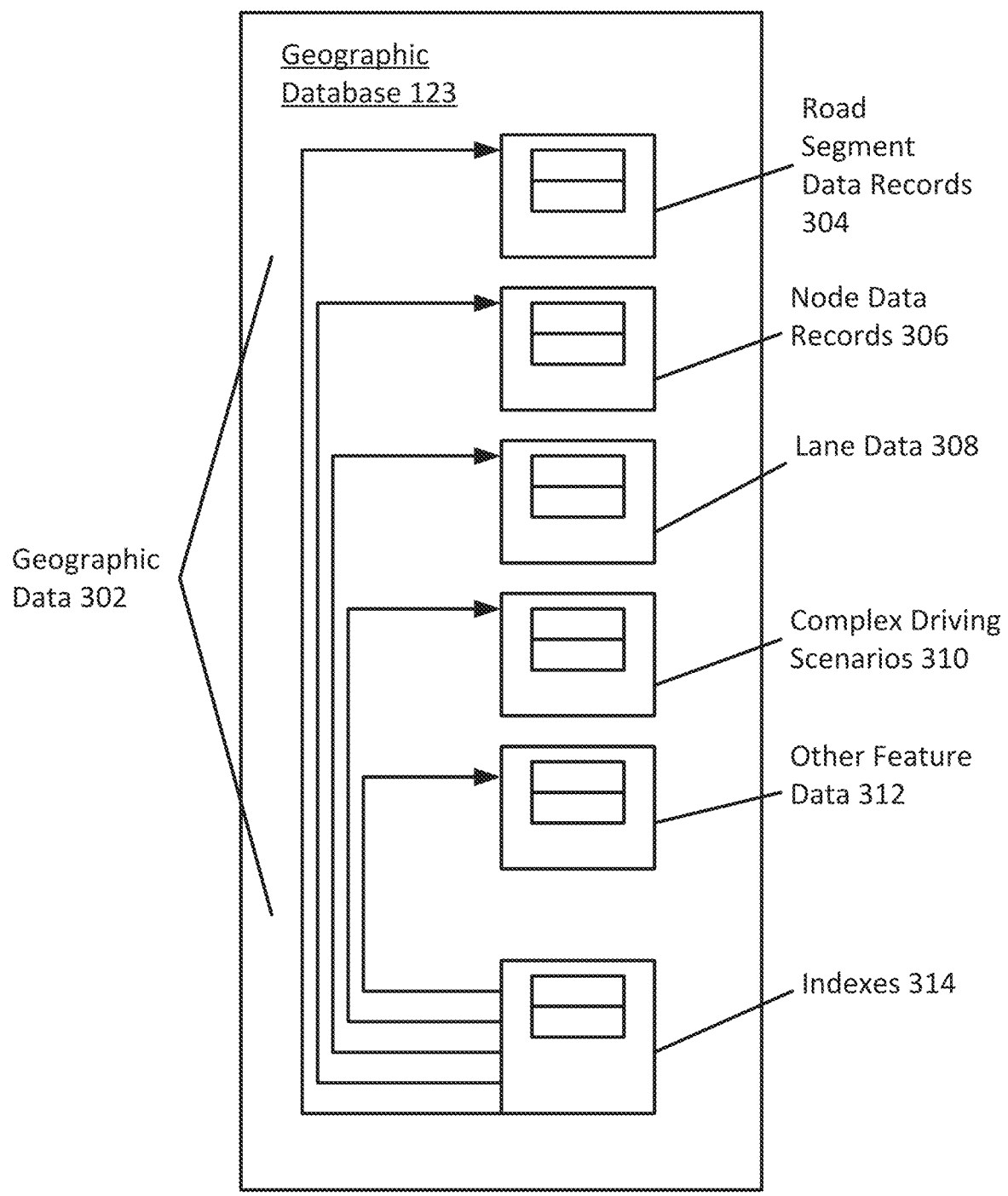
FIG. 9 depicts example indexes of the geographic database.

As depicted in FIG. 9, in one embodiment, the geographic database 123 contains geographic data 302 that represents some of the geographic features in the geographic region 202 depicted in FIG. 8. The data 302 contained in the geographic database 123 may include data that represent the road network 208. In FIG. 9, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The complex driving data 310 may include data or sub-indices or layers for different types of scenarios. The feature data 312 may include other roadway features.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 10:
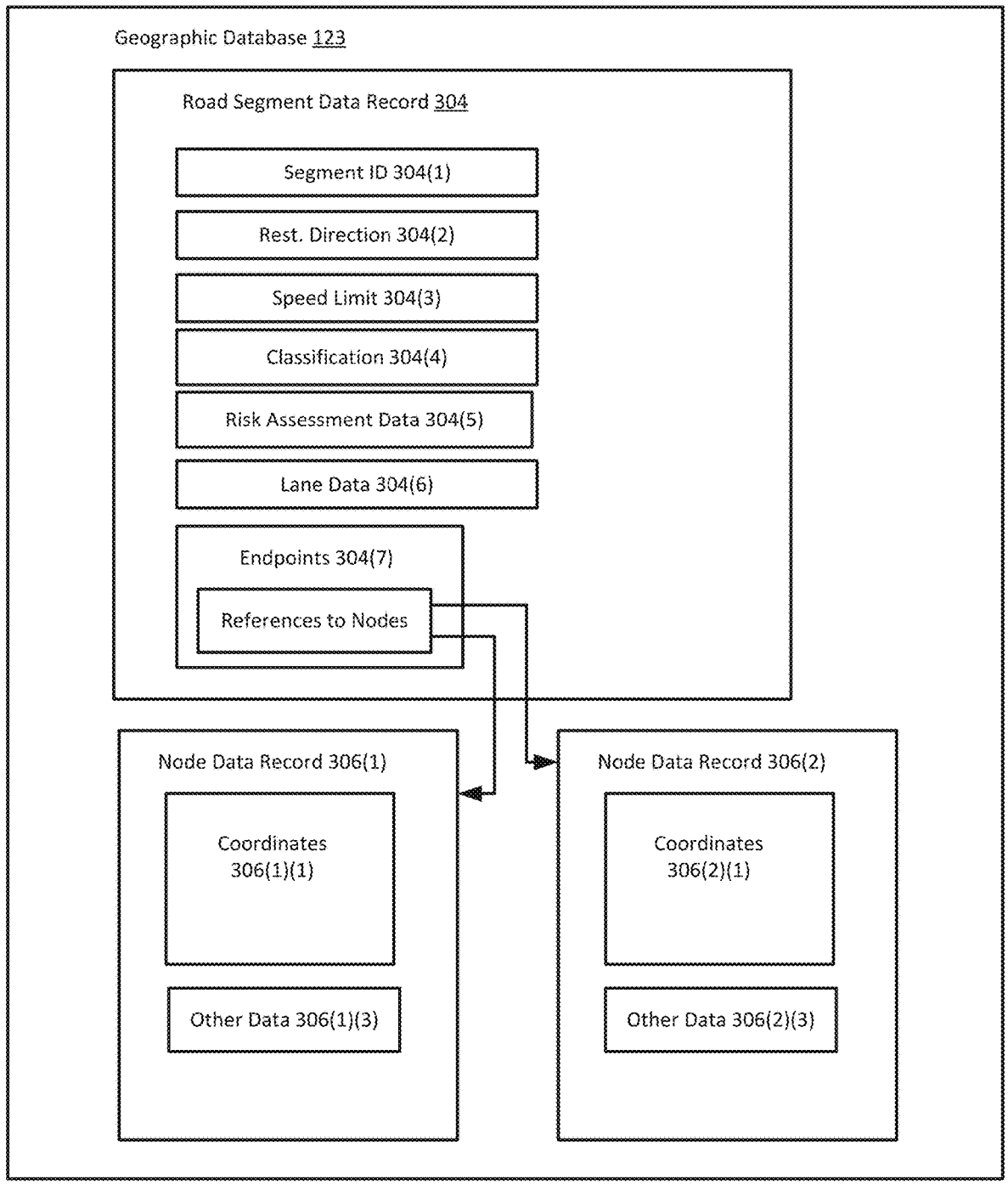
FIG. 10 depicts example data entries in the indexes of the geographic databases.
Figure 11:
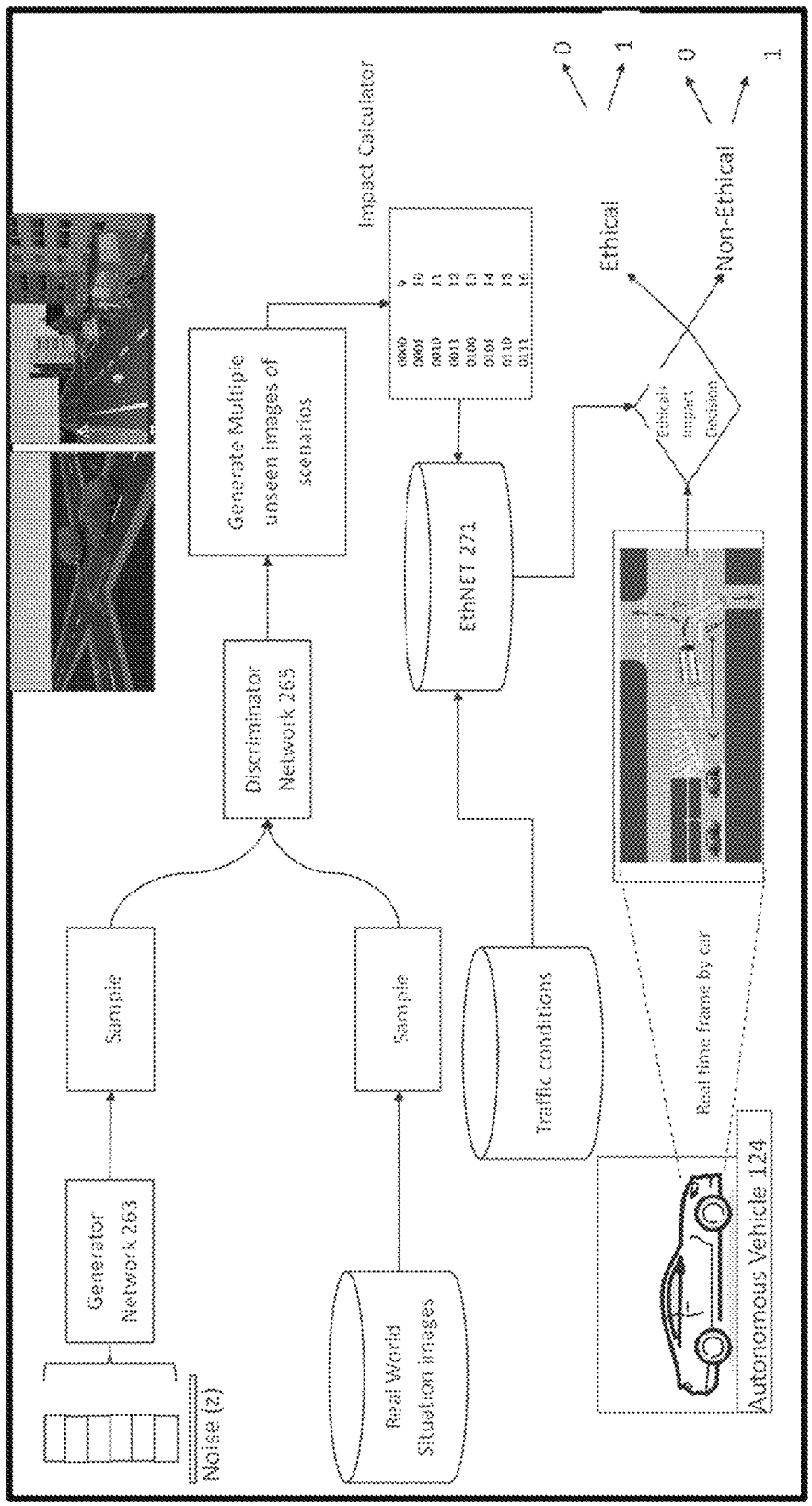
FIG. 11 depicts an example of the system of applying the ETHNET according to an embodiment.

FIG. 10 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to risk assessment that may be used to identify ethically complex scenarios. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record, or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 10 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 9, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes. The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

At act A220, the controller 900 inputs the scenario data into a trained deep learning model. The trained deep learning model may be stored in the memory 904. The memory 904 may be a volatile memory or a non-volatile memory. The memory 904 may include one or more of a read-only memory (ROM), random access memory (RAM), a flash memory, an electronic erasable program read only memory (EEPROM), or other type of memory. The memory 904 may be removable from the mobile device 122, such as a secure digital (SD) memory card.

At act A230, the trained deep learning model outputs one or more driving instructions. The trained deep learning model is trained using synthetic data generated using a GAN 261. A CNN is used to identify ethically complex driving scenarios using the following steps.

1. Take real world scenarios as raw input image—source to be used may be, for example, true drive files, drone-based images, or high-resolution satellite data.
2. Edge detection for identifying obstructions, anomalies in such spots.
3. Overlay Road network (ped, Ramps, highways, streets, crossings, etc).
4. Overlay junctions.
5. Overlay Traffic condition (DoT, Access restrictions, etc).
6. Overlay topography layer.
7. Outputs of steps 2, 3, 4, 5, 6 become input matrices/conditions.
8. Run a CNN through the input matrices to classify the output as an ethically complex driving scenario—yes/no. For example, the presence of all or minimum 4 of input matrices is definitely a dominant ethically complex driving scenario. Presence of Less than three input matrices or conditions classifies the area as a weaker ethically complex driving scenario.

Next a GAN 261 is used to generate a large volume of diverse scenarios using the followings steps. A generator network 263 is implemented. Using normal road condition images as noise, and classified ethically complex driving scenario images as true data, a generator network 263 is created which gives output of synthetic ethically complex driving scenario images/conditions. A discriminator network 265 is used. Using ethically complex driving scenario classified images as dynamic and a base map as fixed input, the discriminator network 265 predicts the accuracy of the images created by generator network 263.

The above two steps can be summarized as using location data and classifying with deep learning to identify ethically complex driving scenarios.

The next step involves a deep learning model that predicts the decisions to be taken when an autonomous vehicle 124 comes across an ethically complex driving scenario. The deep learning model is referred to as ETHNET 271 or ethical neural network. The Inputs include topographically categorized ethically complex driving scenario maps and normal ethically complex driving scenario maps. Each set of inputs will be mapped to a driving decision that is ethical and more human like. Initially inputs will be given manually. The manual driving decisions are mapped to the ethically complex driving scenarios and then used to convert a larger set of synthetic ethically complex driving scenario images (inputs-cat a, cat b) to text. This may be done using text summarization process of Natural language processing. The architecture used will be CNN and Transformers Next output classes of driving direction are created. Driving directions are finite. A vehicle 124 can either move forward, backwards, left, right, or take a u turn or go round, accelerate or slow down. Extreme conditions will be either start or stop.

Figure 12:
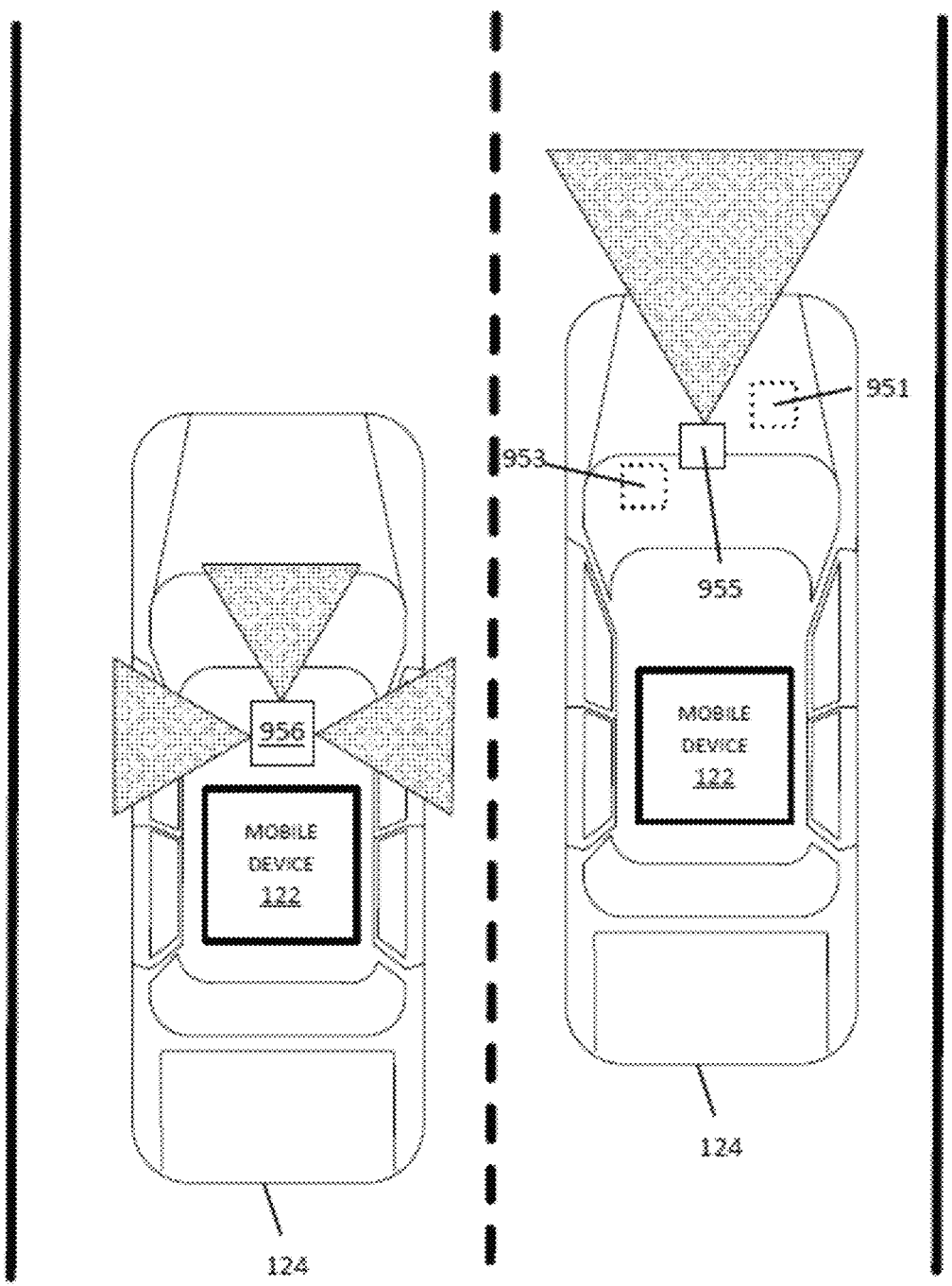
FIG. 12 depicts an example autonomous vehicle according to an embodiment.

Next a random forest classifier is created for decision prediction: Once the training dataset is ready, a random forest classifier is trained on the training dataset. The random forest classifier is a combination of several decision trees that are be mapped to the final output of classes of driving direction. Since the training dataset is containing numerous conditions of ethically complex driving scenarios and its related ethical driving decision, the use of random forest model enables to predict driving decisions based on such conditions. The final output is a model called ETHNET 271 that trains an autonomous vehicle 124 to take real time driving decisions when faced with complex situations. FIG. 12 depicts an example of a ETHNET 271 trained using multiple unseen images of scenarios generated by the GAN 261 (generator network 263 and discriminator network 265). The model ETHNET 271 may be stores locally on the device 122 or accessed through, for example, the server 125 or mapping system 121.

At act A240, the device 122 implements the one or more driving instructions. The device 122 may provide the instructions using the display 914 or may transmit the instructions directly to a connected autonomous vehicle 124.

The communication interface 818 and/or communication interface 918 may include any operable connection or transmitter. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

FIG. 12 illustrates exemplary autonomous vehicles 124 for providing location-based services or application using the systems and methods described herein as well as collecting data for such services or applications described herein. The autonomous vehicles 124 may include a variety of devices that collect position data as well as other related sensor data for the surroundings of the autonomous vehicle 124, here depicted as a car, but which use and configuration may be applied to bikesharing, scootersharing, or other autonomous vehicles 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LiDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the autonomous vehicle 124 to the mapping system 121. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and the mapping system 121. The network may be the Internet or connected to the internet.

The sensor array may include one or more sensors configured to detect surroundings of the autonomous vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the autonomous vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the autonomous vehicle 124, which may include assisted driving vehicles such as autonomous vehicles 124, highly assisted driving (HAD), and advanced driving assistance systems (ADAS). Any of these assisted driving systems may be incorporated into mobile device 122. Alternatively, an assisted driving device may be included in the autonomous vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the mapping system 121 and driving commands or navigation commands.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for teaching an autonomous vehicle to make real time driving decisions when faced with ethically complex scenarios, the method comprising:
generating synthetic ethically complex driving scenario data using a generative adversarial network comprising a generator network and a discriminator network, wherein the generator network is configured by:
inputting noise data into the generator network;
outputting synthetic ethically complex driving scenario data;
inputting, randomly, synthetic ethically complex driving scenario data generated by the generator network and real ethically complex driving scenario data into a discriminator network;
attempting to determine, by the discriminator network, which inputs are synthetic ethically complex driving scenario data and which inputs are real ethically complex driving scenario data;
adjusting, based on the attempt to determine, the generator network, the discriminator network, or the generator network and the discriminator network; and
repeating inputting, outputting, inputting, attempting, and adjusting for a plurality of iterations or until the generator network and the discriminator network converge;
inputting the synthetic ethically complex driving scenario data into a deep learning model that outputs one or more driving decisions to be taken by the autonomous vehicle when input synthetic ethically complex driving scenario data;
comparing the output one or more driving decision of the deep learning model with annotated driving decisions related to the input;
adjusting the deep learning model based on the comparison;
repeating inputting, comparing, and adjusting for a plurality of iterations; and
outputting a trained deep learning model.

2. The method of claim 1, wherein the noise data comprises normal driving scenario data.

3. The method of claim 1, wherein the real ethically complex driving scenario data is acquired by one or more probe devices as the one or more probe devices traverse a roadway.

4. The method of claim 1, wherein the synthetic ethically complex driving scenario data and the real ethically complex driving scenario data comprises data relating to locations or scenarios that require at least one ethically complex driving decision.

5. The method of claim 4, wherein the synthetic ethically complex driving scenario data and the real ethically complex driving scenario data comprise image data.

6. The method of claim 1, wherein the deep learning model comprises a random forest classifier.

7. The method of claim 1, wherein the annotated driving decisions comprise manually annotated driving decisions.

8. The method of claim 1, further comprising:
acquiring information about a roadway by an autonomous vehicle while traversing the roadway;
identifying an ethically complex driving scenario;
inputting information about the ethically complex driving scenario to the trained deep learning model; and performing, by the autonomous vehicle, driving decisions output by the trained deep learning model.

* * * * *